United States Patent

[11] 3,600,979

[72] Inventor Walter J. Rozmus
 Hubbardsville, N.Y.
[21] Appl. No. 781,018
[22] Filed Dec. 4, 1968
[45] Patented Aug. 24, 1971
[73] Assignee Utica Tool Company, Inc.
 Orangeburg, S.C.

[54] METHOD AND APPARATUS FOR MANUFACTURING PLIERLIKE TOOLS
 20 Claims, 10 Drawing Figs.

[52] U.S. Cl. ............................................. 76/101 R,
 29/505, 29/520, 76/104 R
[51] Int. Cl. ............................................. B21k 21/00
[50] Field of Search ............................................. 76/101, 101
 D, 104 A; 29/505, 520

[56] References Cited
UNITED STATES PATENTS
2,286,874  6/1942  Schwartz ..................... 76/104 A
2,565,552  8/1951  Ern ............................. 76/104 A
3,130,489  4/1964  Schlage ........................ 29/432

Primary Examiner—Bernard Stickney
Attorney—Harness, Dickey & Pierce

ABSTRACT: A method and apparatus for manufacturing plierlike tools, with the apparatus consisting of a support structure disposed adjacent an associated machine tool; clamping means adapted to removably secure the plierlike tool components on the support structure, and means for supporting the aforesaid clamping means on the support structure for selective rotational indexing movement, whereby the tool components may be oriented in a first position wherein the associated machine tool can perform a first machining operation thereon and thereafter, the tool component may be rotationally indexed to a second position wherein the machine tool can perform a second operation thereon; the tool components being initially partially machined and thereafter subject to a hardening operation such as a heat treating operation, with a final machining operation being performed by the aforesaid apparatus subsequent to the hardening operation and prior to final assembly of the components.

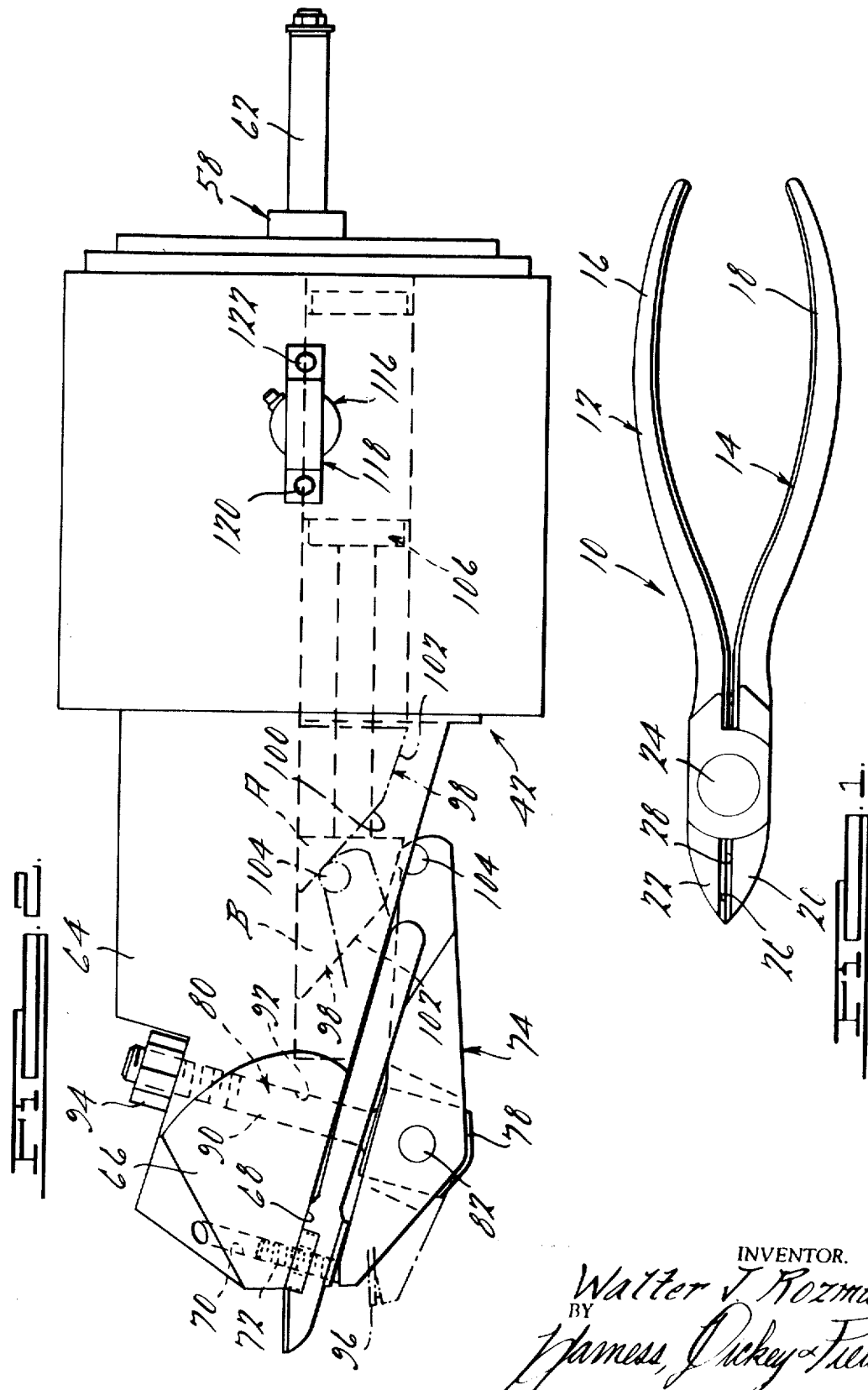

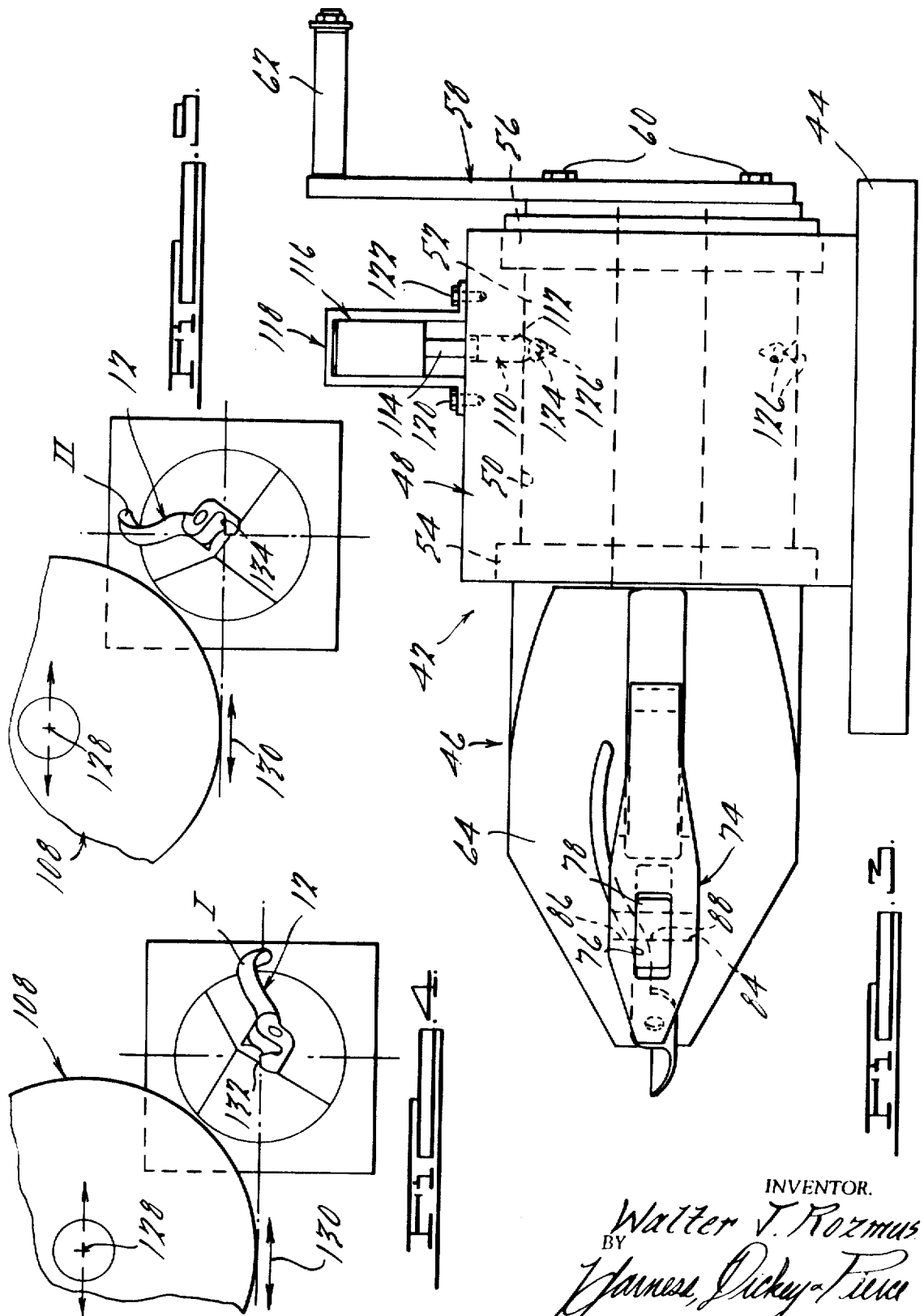

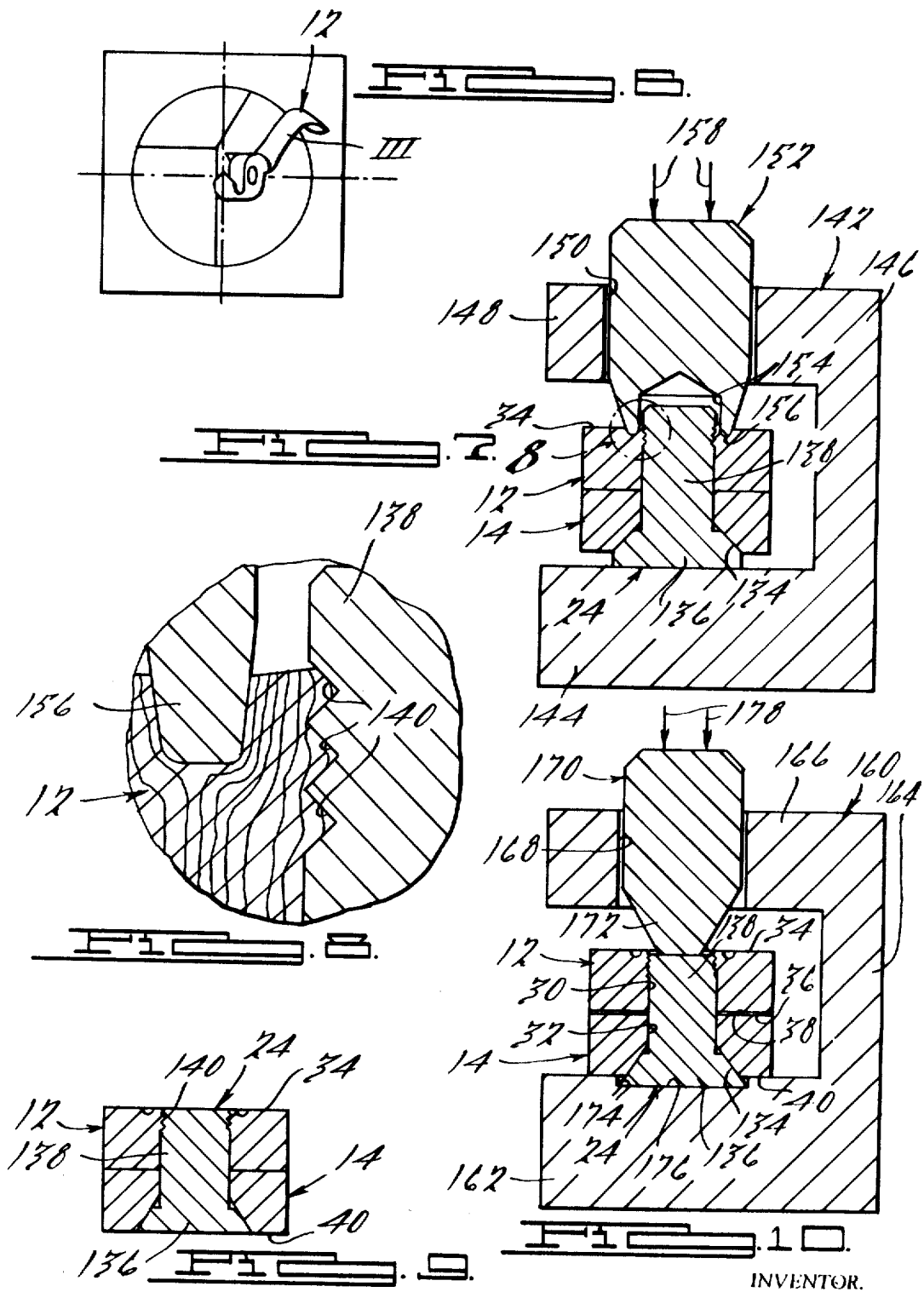

METHOD AND APPARATUS FOR MANUFACTURING PLIERLIKE TOOLS

BACKGROUND OF THE INVENTION

In the manufacture of plierlike tools, such as cutting pliers, it is extremely desirable that the cutting edges of the pliers be machined for example, as by grinding or the like, subsequent to the plier components being heat treated. However, this procedure has been virtually impossible to accomplish, at least from an economical standpoint, after the plier components have been joined together or assembled, due primarily to the difficulty in supporting and maneuvering the pliers relative to the grinding or similar tooling utilized in the machining operations. In order to obviate the difficulties involved in machining the pliers' parts after they have been assembled, it has been the practice in the pliers industry to heat treat the pliers after assembly. It has been found that it is of no particular problem to grind or machine the pliers' cutting edges before assembly and after heat treating, provided proper tooling is used. The problem, however, has been how to connect or rivet the pliers' parts together when the rivet or pivot pin itself must be of a hardened material.

SUMMARY OF THE INVENTION

This invention relates generally to a method and apparatus for manufacturing and assembling hand tools, and more particularly, to a method and apparatus for manufacturing plierslike tools of the type featuring interengageable cutting edges. According to the present invention, plierslike cutting tools are adapted to be manufactured by following the method of initially roughly forming the pliers components by suitable forging, milling or broaching operations; thereafter subjecting the components to a heat treating operation to effect preselected hardening thereof, thereafter placing the components in a novel spindle assembly which cooperates with an associated grinding machine or the like to form precision cutting edges on the pliers halves, and finally, assembling the pliers halves with a prehardened pivot member by subjecting the pliers halves to crimping and pinching operations so as to fixedly, pivotably secure the pliers halves together. The apparatus of the present invention comprises, in part, the aforementioned spindle assembly which consists of a clamping jaw member and a camming bar which is actuatable between extended and retracted positions for selectively engaging the clamping jaw with the pliers halves and thereby securing the same to the associated spindle assembly. The spindle assembly is designed such that the cutting edges formed on the pliers halves lie along the rotational axis of the assembly, whereby to assure accurate symmetrical cutting edges formed on the pliers halves, and such that the pliers halves need not be removed and repositioned preparatory to each grinding operation involved in forming the cutting edges thereon.

It is, therefore, an object of the present invention to provide a new and improved method and apparatus for manufacturing plierslike tools of the above described character.

It is a more particular object of the present invention to provide a new and improved method and apparatus for manufacturing plierslike tools which obviate many of the heretofore known manufacturing problems experienced in connection with the manufacture of plierslike tools.

It is another object of the present invention to provide a new and improved apparatus for manufacturing plierslike tools which will function to accurately support a plier component in a position wherein a precision cutting edge may be machined thereon, which edge is accurately oriented relative to the pivotal axis of the component member.

It is a further object of the present invention to provide a new method of manufacturing plierlike tools which includes the steps of performing initial milling or broaching operations on the components thereof, thereafter heat treating the component members, and finally, subject the members to a final machining operation in which precision cutting edges are provided thereon.

It is a related object of the present invention to provide a method of assembling the component members of a plierlike tool by initially inserting a pivot pin member through aligned bores formed therein, and thereafter engaging one of the members with a ramlike tool so as to cause material of one of the members to deform into engagement with another of the members so as to positively, pivotably secure the members together.

It is still another object of the present invention to provide a new and improved method and apparatus for manufacturing plierlike tools which permits convenient assembly subsequent to heat treating and initial machining thereof, thereby eliminating the necessity of hand filing, stoning and hammering the tool after assembly thereof.

Other objects and advantages of the present invention will become apparent from the following detailed description, taken in conjunction with the accompanying drawings.

BRIEF DESCRIPTION OF THE DRAWINGS

FIG. 1 is a top elevational view of a pair of cutting pliers manufactured in accordance with the principles of the present invention;

FIG. 2 is a top elevational view of a portion of the apparatus for manufacturing pliers of the type illustrated in FIG. 1 and embodying the principles of the present invention;

FIG. 3 is a side elevational view of the apparatus illustrated in FIG. 2;

FIG. 4 is a schematic view of the end of the apparatus illustrated in FIGS. 2 and 3 as shown in operative association with a typical machining tool adapted to perform machining operations on a pliers component supported by the apparatus of the present invention;

FIG. 5 is a schematic view, similar to FIG. 4, and illustrates the apparatus of the present invention when supporting a plier component in a different orientation with respect to the components supported in FIG. 4;

FIG. 6 is another schematic view, similar to FIGS. 4 and 5, and illustrates the plier component subsequent to having a pair of precision cutting edges formed thereon;

FIG. 7 is a fragmentary cross-sectional view taken through a pair of pliers manufactured in accordance with the present invention and shown in operative association with the assembly jig adapted to perform a final assembly operation upon the component parts of the pliers;

FIG. 8 is an enlarged fragmentary cross-sectional view of a portion of the structure illustrated within the circle 8 of FIG. 7;

FIG. 9 is a transverse cross-sectional view through a pair of pliers manufactured in accordance with the present invention, as shown subsequent to the final assembly operation being performed thereon, and FIG. 10 is a transverse cross-sectional view through the pliers manufactured in accordance with the present invention, and as shown in operative association with an associated apparatus for performing the final assembly operation thereon.

DETAILED DESCRIPTION OF A PREFERRED EMBODIMENT

Workpiece Supporting Apparatus

Referring now in detail to the drawings, and in particular to FIG. 1, a plierslike tool, generally designated 10, and constructed in accordance with the principles of the present invention, is shown as comprising a pair of combination jaw-handle members 12 and 14. The members 12, 14 comprise handles 16, 18, respectively, and jaw sections 20, 22, respectively, and are pivotably connected by means of a suitable pivot pin or the like 24 in a manner such that pivotal movement of the handle sections 16, 18 toward or away from one another about the pivotal axis defined by the pin 24 will result in corresponding movement of the jaw sections 20, 22 toward and away from one another. The jaw sections 20, 22 define abuttingly engageable cutting edges 26 and 28 which are adapted to be formed on the members 12, 14 in accordance with the method and apparatus of the present invention, as will hereinafter be described in detail.

Generally speaking, the combination handle-jaw members are originally provided in the form of round bar stock which is subjected to initial forging operations and thereafter to various machining operations that include the drilling of suitable openings 30 and 32 therein for receiving the pivot pin 24. Thereafter, suitable milling or broaching operations are then performed for providing spaced parallel face portions 34, 36 and 38, 40 along the opposite sides of the members 12, 14, respectively. During such initial machining operations, the cutting edges 26, 28 are only partially machined, and after such initial machining, the members 12, 14 are subjected to a suitable heat treating operation, as is well known in the art, wherein the members are appropriately hardened. Thereafter, the members 12, 14 are designed to be subjected to a subsequent machining operation wherein the cutting edges 26, 28 are completely formed, as, for example, by means of a suitable grinding operation. The members 12, 14 are adapted to be operatively supported for such grinding operations by means of a new and improved apparatus embodying certain principles of the present invention, and which apparatus will hereinafter be described in detail. Subsequent to the members 12, 14 being initially machined and prior to the final machining of cutting edges 26, 28 thereon, said members 12, 14 are adapted to be subjected to a hardening operation, preferably as by heat treating. The heat treating is preferably accomplished by heat treating the entire members 12, 14 and thereafter subjecting the jaw sections 20, 22 thereof to a subsequent induction hardening process. In a preferred construction of the present invention, the members 12, 14 are hardened to approximate 42 to 55 Rockwell, while the cutting edges 26, 28 thereof are hardened to approximately 60–62 Rockwell. The pivot pin 24 is preferably hardened to approximately 55 Rockwell. It will be noted that the members 12, 14, for all practical purposes, are identical in construction and operation, and therefore, for purposes of simplification of description, the method of manufacturing the members 12, 14 is substantially the same and wherever possible in the specification, manufacturing steps in producing the members 12, 14 will be directed only toward one of said members. Also, it will be noted that since the members 12, 14 are essentially identical in construction, the apparatus hereinafter described, with only minor modifications, will be applicable for use in the manufacture of both of the members 12, 14.

As best seen in FIGS. 2 and 3, a workpiece support apparatus, generally designated by the numeral 42 and adapted to operatively support the members 12, 14 as machining operations are performed thereon, is shown as comprising a generally flat support structure or base section 44 and a generally rotatable spindle assembly 46. The support structure 44 comprises an annular housing section 48 defining a central, generally cylindrical shaped cavity or chamber 50. The chamber 50 is adapted to rotatably receive a generally cylindrically shaped mounting section 52 formed at one end of the spindle assembly 46, with suitable antifriction bearing means 54 and 56 being provided interjacent the outer periphery of the mounting section 52 and the inner periphery of the chamber 50, whereby to support the spindle assembly 46 for rotation about a generally horizontal axis extending through the housing section 48. Depending upon whether or not the apparatus 46 is intended to be entirely automatic in operation, or alternatively, be manually actuated, the spindle assembly 46 may be provided with any suitable means for effecting rotation thereof relative to the support structure 44. By way of example, means for manually rotating the assembly 46 may be provided by a suitable handle member 58 extending radially outwardly from the mounting section 52 and fixedly secured thereto by means of suitable screws, bolts or the like 60. The member 58 may be provided with a generally axially extending, manually engageable gripping section 62 adapted to be clasped by the operator and rotated in a manner so as to effect rotation of the assembly 46 in either a clockwise or counterclockwise direction. It will be readily apparent, of course, that various types of power operated means may be employed for effecting rotation of the assembly 46, and that such power actuated means may be made to operate automatically, semiautomatically or incrementally commensurate with techniques well known in the art.

As illustrated in FIGS. 2 and 3, the spindle assembly 46 is provided with a workpiece clamping or support section 64 which extends outwardly from the mounting section 52 and is adapted to rotate concomitantly therewith. The support section 64 includes a head portion 66 at the axially outer end thereof which defines an upwardly and outwardly inclined surface 68 and if formed with a suitable bore 70 adapted to receive one end of a generally cylindrical-shaped guide pin or stud 72. Workpieces, such as the combination jaw-handle members 12 or 14 are adapted to be supported on the lower side of the head portion 66 in a manner such that the guide pin 72 extends through the central opening 30 or 32 thereof such that the face portion 34 or 40 adjacent the cutting edges 26 or 28 are contiguously engaged with the inclined surface 68. When the members 12, 14 are thus oriented and supported upon the support section 64 of the spindle assembly 42, the cutting edges 26, 28 thereof will lie along a generally horizontal line which is colinear with the rotational axis of the assembly 46, as will hereinafter be described in detail.

The spindle assembly 46 is provided with means for detachably clampingly securing successive workpieces, such as the members 12, 14 to the surface 68, with such means preferably being in the form of an elongated, pivotably mounted clamping jaw 74. The jaw 74 is formed with a central, downwardly extending opening 76 which is generally rectangular in horizontal cross section (see FIG. 3), and is adapted to have a generally rectangular-shaped mounting section 78 of a boltlike support member 80 received therewithin. Means in the form of a transversely extending pivot pin or the like 82 extends through suitable aligned openings 84 and 86 formed in the jaw 74 and through a similar opening or bore 88 formed in the center of the mounting section 78, whereby to secure the jaw 74 on the member 80 for pivotal movement between the solid and phantom line positions shown in FIG. 2. The mounting member 80 comprises a generally cylindrical-shaped, upwardly extending shank section 90 which extends through a suitable upwardly inclined bore 92 formed in the head portion 66 of the clamping section 64, with the upper end of the shank section 90 being externally threaded and thereby adapted to receive a suitable nut or the like 94 for positively securing the member 80 on the spindle assembly 42. The forward (left) end of the clamping jaw 74 is provided with a pressure or bearing pad 96 which is adapted to cooperate with the surface 68 in clampingly securing a workpiece, such as one of the members 12 or 14, to the assembly 42 when the clamping jaw 74 is disposed in the solid line position in FIG. 2.

Means for selectively biasing the clamping jaw 74 to a position clampingly securing a workpiece on the spindle assembly 46 is provided by a longitudinally extending, slidably disposed camming bar, generally designated 98, which is disposed on the lower side of the workpiece clamping section 64 and defines a pair of outwardly inclined camming surfaces 100 and 102 along the lower side thereof. Suitable means (not shown) is provided on the assembly 46 for supporting the camming bar 98 for longitudinal sliding movement, such that movement thereof from the retracted position A shown in FIG. 2 to the extended or actuated position B shown in this Figure will result in the camming surfaces 100, 102 engaging a generally laterally extending boss portion 104 provided on the rearward end of the clamping jaw 74. As the camming surfaces 100, 102 engage the portion 104, upon longitudinal outward movement of the camming bar 98, the entire clamping jaw 74 will be rotated or pivoted about the axis of the pivot pin 80 from the phantom position shown in FIG. 2 to the solid line position, thereby fixedly securing a workpiece on the assembly 46. Similarly, upon rearward movement or retraction of the camming bar 98, the camming surfaces 100, 102 will move rearwardly and out of engagement with the boss portion 104, whereby to permit the clamping jaw 74 to move from the solid line position in FIG. 1 to the phantom line position, thereby permitting removal of one workpiece and insertion of a new one in its place preparatory to a subsequent operation cycle. Although various means may be provided for selectively longitudinally biasing the camming bar 98 between its respective extended and retracted positions, the apparatus 42 is preferably provided with a suitable hydraulic or pneumatic power operated piston and cylinder assembly 106, disposed interiorly of the mounting section 52, for effecting the desired movement of the camming bar 98. Such a piston and cylinder assembly 106 is preferably, although not necessarily, of the double-action type, as is well known in the art.

As will be described in detail, the spindle assembly 46, together with the workpieces supported thereon, is adapted to be rotated or indexed between preselected rotational positions relative to an associated machine tool, such as the grinding wheel or the like 108 shown in FIGS. 4 and 5. In particular, the spindle assembly 46 is adapted to rotate a workpiece between the operative positions shown in FIGS. 4, 5 and 6 as various machining operations are performed on the workpiece. Toward this end, the apparatus 42 of the present invention is preferably provided with means for lockingly securing the spindle assembly 46 in various preselected rotational positions so that said assembly 46 is accurately positioned while machining operations are being performed on workpieces supported thereby. Such means is preferably provided by a generally radially extending positioning pin 110 (see FIG. 3) which is slidably disposed within a suitable radially outwardly extending bore or passage 112 formed in the annular housing section 48. The positioning pin 110 is adapted to be mounted on the innermost end of a generally radially disposed piston rod 114 of an associated pin and cylinder assembly, generally designated 116, that is secured by means of a suitable U-shaped mounting bracket 118 and suitable bolts 120, 122 to the housing section 48. The assembly 116 is designed to operate such that upon actuation thereof, the positioning pin 110 will move radially inwardly to the position shown in FIG. 3, and upon deactuation thereof, the positioning pin 110 will be biased, via the piston rod 114, to a relatively retracted position. As illustrated, the innermost end of the positioning pin 110 is provided with a generally tapered or pointed end portion 124 which is adapted to be selectively received within a series of axially aligned, circumferentially spaced positioning holes or recesses, generally designated 126, formed around the periphery of the mounting section 52 of the spindle assembly 46. The recesses 126 are circumferentially spaced in accordance with the relative operative positions to which a workpiece is to be oriented as successive machining operations are performed thereon. For example, preferably three recesses 126 are provided on the mounting section 52 such that the positioning pin 110 may be received therein as a workpiece is successively positioned in each of the three positions I, II, III shown in FIGS. 4 through 6, respectively. Thus, it will be seen that the spindle assembly 46 may be rotated such that the workpiece supported thereon is positioned as shown in FIG. 4, at which time the assembly 116 may be actuated to extend the positioning pin 110 and thereby nonrotatably secure the said assembly 46 at this position so that a machining operation may be performed on the workpiece. Thereafter, the assembly 116 may be actuated so as to withdraw the pin 110 and permit the spindle assembly 46 to be rotated such that the workpiece is disposed in position II, as shown in FIG. 5, and the assembly 116 may again be actuated to extend the positioning pin 110 to lockingly secure the assembly 46 in said position. Similarly, the positioning pin 110 and assembly 116 may be operated to secure the spindle assembly 46 and the workpiece supported thereon in the position III shown in FIG. 6.

Method Of Grinding Cutting Edges

In accordance with the principles of the present invention, the apparatus 42 is adapted to be operatively supported adjacent a machine tool, such as the aforedescribed grinding wheel 108, which is supported for rotational movement about a generally horizontally disposed rotational axis 128 and is adapted to be advanced and retracted in the direction of the arrows 130 in FIGS. 4 and 5. As previously described, the handle members 12, 14 are adapted to be supported upon the spindle assembly 46, and the assembly 46 is rotatably positioned such that the members 12, 14 are initially oriented in the position of I in FIG. 4. Thereafter, the grinding wheel 108 is energized and is advanced toward the members 12, 14 so as to thereby grind a horizontal surface 132 thereon, with this surface lying along the rotational axis of the spindle assembly 46. Thereafter, the entire assembly 46 and member 12 or 14 supported thereon is rotated to position II shown in FIG. 5. Thereafter, the grinding wheel 108 is again advanced to form a horizontally extending surface 134 which also lies along the rotational axis of the assembly 46. The surfaces 132 and 134 thus formed define the cutting edge 26 or 28, which edge 26, 28 coincide with the rotational axis of the assembly 46.

For certain types of cutting pliers it is desirable that the cutting edges thereof not be sharp, in which case a small "flat" which is approximately 0.005–0.010 inches across is provided along the cutting edges of the pliers jaw-handle members instead of having the cutting edges defined by the intersection of the surfaces 132, 134 formed by the grinding wheel 108. When it is desired to provide such "flats" on either or both of the combination jaw-handle members 12, 14, said member(s) is supported upon the assembly 42 and the spindle assembly 46 is rotated so that the member 12 is disposed in position III in FIG. 6. Thereafter, the grinding wheel is advanced to form a horizontal surface consisting of the flat, with the surface thus formed lying along the horizontal center line of the cutting edge. Thereafter, the member 12 and/or 14 is subjected to the previous two grinding operations wherein the surfaces 132 and 134 are formed. The width of the flat is controlled by raising or lowering the apparatus 42 relative to the horizontal line along which the periphery of the grinding wheel 108 travels. That is, if a relatively large flat is desired, the apparatus 42 is positioned such that the member 12 is relatively close to the path of travel of the grinding wheel 108. Conversely, if a relatively sharp edge, i.e., small flat, is desired, the apparatus 42 is positioned such that the members 12, 14 are somewhat further from the line of travel from the grinding wheel 108.

METHOD OF ASSEMBLY

The combination jaw-handle members 12, 14 of the pliers 10 are adapted to be assembled in accordance with certain principles of the present invention, as follows. Initially, it will be noted that the openings or bores 30, 32 are formed in the members 12, 14 such that the bore 30 is slightly smaller in diameter than the diameter of the cylindrical pivot pin 24, and that the diameter of the bore 32 is slightly larger in diameter than the pivot pin 24. Also, it will be noted that the bore 32 is formed with a frustoconical counterbore 134 at the outerside thereof, and that the pivot pin 24 comprises a generally frustoconical head section 36 and a cylindrical shank section 138 which is formed with a plurality of radially inwardly extending grooves 140, as best illustrated in FIG. 8. Preferably, the grooves 140 are approximately 0.007 inches deep and are axially spaced from one another and are not connected (unlike a helical thread). It is to be noted that the initial length of the pivot pin 24 is such that the ends thereof protrude above and below the members 12 and 14 upon initial assembly thereof. The protruding ends of the pivot pin 24, as will later be described, are eventually removed, as by grinding or the like and provide a "built in" security factor due to tolerance deviations in the overall lateral thicknesses of the members 12, 14.

The members 12, 14 are adapted to be preferably assembled on a generally C-shaped fixture or the like, generally designated 142, having a generally horizontally disposed base section 144, a generally vertically disposed intermediate section 146, and an upper guide section 148 which extends horizontally and is spaced above the base section 144. The guide section 148 is formed with a central opening or guideway 150 and is adapted to receive a suitable crimping tool or ram 152, the lower end of which is formed with an annular recess 154 which defines an annular crimping flange 156 around the lower end of the ram 152. Upon assembly of the members 12, 14 and 24, the upper protruding end of the pivot pin 24 is adapted to be received within the annular recess 154, with the result that the pivot pin 24 acts as a "locator" to assure proper alignment of the pin 24 with the ram 152 preparatory to actuation of the ram 152.

After the members 12, 14 and 24 are preassembled and arranged in the position shown in FIG. 7 within the fixture 142, with the ram 152 being surmounted above the upper protruding end of the pivot pin 24, the ram 152 is subjected to a preselected downwardly directed force, as indicated by the arrows 158 in FIG. 7, with the result that the ram 152 will be forced downwardly into the surface 34 of the member 22 circumjacent the pivot pin 24. As the annular flange 156 is thus forced downward into the member 12, a certain amount of material of the member 12 is forced or deformed radially inwardly into the grooves 140 formed in the upper end of the pivot pin 24, as best seen in FIG. 8. As the material of the member 12 is thus forced into the grooves 140, the pivot pin 24 is axially and nonrotatably secured to the member 12, and the ram 152 may thereafter be biased upwardly or retracted to release the assemblage consisting of the members 12, 14 and pivot pin 24 from within the fixture 142.

After the pivot pin 24 is thus secured within the members 12 and 14, the opposite ends thereof are preferably subjected to a machining operation, wherein the pivot pin ends are removed so as to be flush or coplanar with the surfaces 34 and 40 of the members 12 and 14, respectively, as best illustrated in FIG. 9. It will be noted that at this point in the assembly of the members 12 and 14, the confronting surfaces 36 and 38 of the members 12 and 14 have been forced into continuous engagement with one another due to the pressure or force exerted by the crimping ram 152. Accordingly, in order to make the pliers 10 functional, i.e., render the members 12 and 14 easily pivotable relative to one another, it is necessary that the pliers 10 be subjected to a final "punching" operation so as to effect a small amount of separation between the surfaces 36, 38.

In order to accomplish the aforementioned punching operation, the pliers 10 are placed within a second fixture, generally designated 160, which is similar to the fixture 142 and comprises a base section 162, an upwardly extending intermediate section 164, and an upper guide section 166. The guide section 166 defines a central guide opening or guideway 168 within which a punching tool 170 is disposed for vertical sliding movement. It will be seen that the lower "working" end of the tool 170 is formed with a reduced diameter end portion 172 which defines an engagement surface at the lower end thereof that is slightly smaller in diameter than the shank section 138 of the pivot pin 24.

The upper side of the base section 162 of the fixture 160 is formed with an annular recess 174 which is vertically aligned with the guideway 168 and is slightly larger in diameter than the head section 166 of the pivot pin 24. The recess 174 defines a generally flat recessed surface 176 which is spaced downwardly from the upper surface of the base section 162 approximately 0.0005 to 0.0001 inches and is adapted to function as follows. Upon insertion of the pliers 10 within the fixture 162 and proper alignment of the pivot pin 24 with the recess 174 and tool 170, the tool is subjected to an axially downwardly directed force, as indicated by the arrows 178 in FIG. 10, whereby the pivot pin 24 is forced axially downwardly relative to the members 12 and 14 until such time as the lower end of the head section 136 engages the surface 176 of the recess 174, which results in relieving the compressive force exerted by the pivot pin 24 against the surfaces 36 and 38 of the members 12 and 14 as a result of the above described crimping operation. With the compressive force between the surfaces 36 and 38 thus relieved, the combination jaw-handle members 12 and 14 will be free to pivot to one another, thus rendering the pliers 10 functional.

It will be seen from the foregoing description that the present invention provides a new and improved method and apparatus for manufacturing plierlike tools in the manner so as to overcome many objectionable manufacturing operations heretofore known in the prior art. In particular, the present invention provides a method and apparatus which enables plierlike tools to be heat treated prior to assembly thereof, thereby obviating the many disadvantages attendant the practice of assembling pliers and thereafter heat treating the same, which practices have involved various scale removing operations, as well as procedures for freeing the relative pivotal members of the tool subsequent to heat treating. By virtue of the new and improved apparatus, hereinabove described, for operatively supporting the tool components as the cutting edges are formed thereon, plierlike tools constructed in accordance with the principles of the present invention will exhibit superior operational characteristics as compared with similar tools heretofore known and used. Accordingly, such tools evolving from the principles of the present invention will find widely diversified and enthusiastic commercial acceptance.

While it will be apparent that the preferred embodiment illustrated herein is well calculated to fulfill the objects above stated, it will be appreciated that the present invention is susceptible to modification, variation and change without departing from the proper scope or fair meaning of the subjoined claims.

I claim:

1. In the method of manufacturing plierslike tools comprising first and second combination handle-jaw members having handle and jaw portions, a pivot pin member adapted to pivotably connect members together, the steps which include,
    at least partially machining said members to form confronting face portions and apertures for acceptance of the pivot pin,
    thereafter subjecting each of said combination handle-jaw members and said pivot pin member to a hardening operation, and assembling said members by inserting said pivot pin member through said apertures and performing a securing operation on said members to maintain the same in an assembled condition.

2. The method as set forth in claim 1 which includes the step of heat treating the handle-jaw members in order to effect hardening thereof.

3. The method as set forth in claim 1 which includes the initial steps of machining the handle-jaw members to an initial rough configuration and for providing aligned pivot pin receiving bores in the members prior to subjecting the same to said hardening operation.

4. The method as set forth in claim 1 which includes the additional step of machining cutting edges on the handle-jaw members subsequent to heat hardening the members and prior to assembly thereof.

5. The method as set forth in claim 1 which includes the initial steps of boring pivot pin receiving openings in the handle-jaw members and milling the members to a preselected configuration; thereafter heat treating the members and the pivot pin to effect hardening thereof, thereafter machining cutting edges on the jaw sections of the handle-jaw members, and finally assembling the members and the pivot pin together.

6. In the method of connecting two relatively movable members together, the steps which include,
    providing aligned bores in each of the members,
    inserting a pivot pin member within the aligned bores, and
    engaging one of the members with a ramlike tool and thereby causing material to be deformed from one of the members into engagement with another of said members to nonrotatably secure said pin member to said one member.

7. The method as set forth in claim 6 which includes the step of using one end of the pivot pin member as a means for guiding the ramlike tool for movement toward and into engagement with said one member.

8. The method as set forth in claim 6 which includes the step of applying an axially directed force against one end of the pivot pin to effect preselected separation between the relatively movable members.

9. The method as set forth in claim 6 which includes the step of using an annular tool for causing material to flow from one of the members into engagement with another member, and thereafter engaging one of the movable members with said annular tool at a position circumjacent the bore provided therein so as to cause material from said one movable member to be deformed into peripheral engagement with the pivot pin member.

10. The method as set forth in claim 9 which includes the step of providing grooves in one of the members and engaging another of the members with a ramlike tool and thereby causing the material to flow from said other member into the groove of said first mentioned member.

11. The method as set forth in claim 9 which includes the step of providing peripheral grooves around the exterior of the pivot pin member and causing material to flow from said one movable member into the grooves to nonrotatably secure said pin member to said one movable member.

12. The method as set forth in claim 8 which includes the step of machining the protruding end of the pivot pin subsequent to engaging said one member with the ramlike tool, and thereafter exerting an axial force against the pivot pin to effect a preselected separation between the movable members.

13. The method as set forth in claim 1 which includes the steps of hardening said combination handle-jaw members by performing a heat treating operation thereon and thereafter performing a subsequent induction hardening operation on only said jaw portions thereof.

14. The method as set forth in claim 1 which includes the step of assembling said members by inserting said pivot pin member within said apertures, and engaging one of said combination handle-jaw members with a ramlike tool and thereby causing material to be deformed from said one member into engagement with said pivot pin member to nonrotatably secure said pivot pin member to said one combination member.

15. The method as set forth in claim 14 which includes the step of using one end of the pivot pin member as a means for guiding the ramlike tool for movement toward and into engagement with said one member.

16. The method as set forth in claim 14 which includes the step of applying an axially directed force against one end of the pivot pin to effect preselected separation between the relatively moveable members.

17. The method as set forth in claim 14 which includes the step of using an annular tool for causing material to flow from one of the members into engagement with another member, and thereafter engaging one of the movable members with said annular tool at a position circumjacent the bore provided therein so as to cause material from said one movable member to be deformed into peripheral engagement with the pivot pin member.

18. The method as set forth in claim 17 which includes the step of providing grooves in one of the members and engaging another of the members with another of the members with a ramlike tool and thereby causing the material to flow from said other member into the groove of said first mentioned member.

19. The method as set forth in claim 17 which includes the step of providing peripheral grooves around the exterior of the pivot pin member and causing material to flow from said one movable member into the grooves to nonrotatably secure said pin member to said one movable member.

20. The method as set forth in claim 16 which includes the step of machining the protruding end of the pivot pin subsequent to engaging said one member with the ramlike tool, and thereafter exerting an axial force against the pivot pin to effect a preselected separation between the movable members.